United States Patent
Oikawa et al.

(10) Patent No.: US 7,269,485 B2
(45) Date of Patent: Sep. 11, 2007

(54) VEHICLE CONTROL APPARATUS AND VEHICLE VIBRATION SUPPRESSION METHOD

(75) Inventors: Yoshitaka Oikawa, Susono (JP); Hideki Takamatsu, Anjo (JP); Shoji Inagaki, Numazu (JP); Yasuhiro Nakai, Anjo (JP); Kenji Kawahara, Kariya (JP)

(73) Assignees: Toyota Jidosha Kabushiki Kaisha, Toyota-shi (JP); DENSO Corporation, Kariya-shi (JP)

( * ) Notice: Subject to any disclaimer, the term of this patent is extended or adjusted under 35 U.S.C. 154(b) by 0 days.

(21) Appl. No.: 11/478,622

(22) Filed: Jul. 3, 2006

(65) Prior Publication Data

US 2007/0005196 A1  Jan. 4, 2007

(30) Foreign Application Priority Data

Jul. 4, 2005  (JP)  ............................. 2005-195124

(51) Int. Cl.
*B60G 7/018* (2006.01)
(52) U.S. Cl. ........................................... 701/1; 701/37
(58) Field of Classification Search ................ 701/1, 701/36, 37, 38, 39; 267/2, 140.11; 280/5.515, 280/124.1
See application file for complete search history.

(56) References Cited

U.S. PATENT DOCUMENTS

| 6,671,596 B2 * | 12/2003 | Kawashima et al. .......... 701/37 |
| 7,103,460 B1 * | 9/2006 | Breed .......................... 701/29 |
| 7,168,709 B2 * | 1/2007 | Niwa et al. .............. 280/5.518 |
| 7,178,818 B2 * | 2/2007 | Katagiri et al. ....... 280/124.144 |

FOREIGN PATENT DOCUMENTS

JP  2004-168148  6/2004

* cited by examiner

*Primary Examiner*—Richard M. Camby
(74) *Attorney, Agent, or Firm*—Oblon, Spivak, McClelland, Maier & Neustadt, P.C.

(57) ABSTRACT

A vehicle control apparatus for controlling a vehicle in response to a target control value includes a first setting unit configured to set a first target control value in response to a driver's request, a correction unit configured to correct the first target control value set by the first setting unit such as to suppress over-spring vibration of the vehicle, a second setting unit configured to set a second target control value in response to conditions different from a driver's request, and an arbitration unit configured to arbitrate between the first target control value and the second target control value, wherein if the second setting unit sets the second target control value, the correction unit is prevented from correcting the first target control value, and the arbitration unit arbitrates between the first target control value not corrected by the correction unit and the second target control value.

14 Claims, 8 Drawing Sheets

VEHICLE CONTROL APPARATUS AND VEHICLE VIBRATION SUPPRESSION METHOD

BACKGROUND OF THE INVENTION

1. Field of the Invention

The present invention relates to an apparatus for controlling vehicle vibration that sets a predetermined target control value relating to the travel of the vehicle, and controls the vehicle based on the target control value, and also relates to a method of reducing the over-spring vibration of the vehicle.

2. Description of the Related Art

Conventionally, vehicle control apparatuses for reducing the vibration of vehicles are known that control at least one of the engine and the brake in response to an input instruction that is a physical quantity corresponding to at least one of the accelerator operation, steering-wheel operation, and brake operation performed by the driver (e.g., Patent Document 1). Such vehicle control apparatuses correct an input instruction given by a driver in order to suppress vehicle vibration by use of a motion model relating to the vibration resulting from the user input instruction, such vibration including at least one of the up-and-down and/or twisting vibration caused by a reaction force applied to the tires, the under-spring vibration of the vehicle body at the suspension, and the over-spring vibration of the vehicle body that is applied to the vehicle body itself.

[Patent Document 1] Japanese Patent Application Publication No. 2004-168148

In recent years, the needs to stabilize the behavior of a vehicle and to avoid a collision have been recognized in order to improve safety at the time of vehicle travel. To this end, a market progress has been being made with respect to vehicle control apparatuses that set a target control value irrespective of the driver's intension based on the measurement of states and conditions of vehicle travel, and controls the vehicle by arbitrating between the target control value and a target control value responsive to the driver's request. Even in a vehicle that is equipped with such vehicle control apparatus, it is preferable to perform the vibration suppression and correction process as previously described. Since such vibration suppression and correction process results in a change in the dynamic characteristics of the vehicle, the vibration of the vehicle may be increased to destabilize the behavior of the vehicle if the target control value set differently from the driver's request is corrected for vibration suppression, or the vibration-suppressed-and-corrected target control value and the differently-set target control value are arbitrated. When the mechanism for vibration suppression and correction is to be incorporated into a vehicle control apparatus, however, it is not desirable, from the viewpoint of cost and burden associated with the development, to design the vehicle control apparatus in conformity to the vibration-suppression-and-correction mechanism.

Accordingly, there is a need for a vehicle control apparatus and vehicle vibration-suppression method that can suppress vehicle vibration satisfactorily, and can easily and properly ensure the safety of the vehicle when a target control value is set in response to conditions different from the driver's request.

SUMMARY OF THE INVENTION

It is a general object of the present invention to provide a vehicle control apparatus and a vehicle vibration-suppression method that substantially obviate one or more problems caused by the limitations and disadvantages of the related art.

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by a vehicle control apparatus and vehicle vibration-suppression method particularly pointed out in the specification in such full, clear, concise, and exact terms as to enable a person having ordinary skill in the art to practice the invention.

To achieve these and other advantages in accordance with the purpose of the invention, the invention provides a vehicle control apparatus for controlling a vehicle in response to a target control value that relates to a travel of the vehicle includes a first target control value setting unit configured to set a first target control value in response to a driver's request, a correction unit configured to correct the first target control value set by the first target control value setting unit such as to suppress over-spring vibration of the vehicle, a second target control value setting unit configured to set a second target control value in response to conditions different from a driver's request, and an arbitration unit configured to arbitrate between the first target control value and the second target control value, wherein if the second target control value setting unit sets the second target control value, the correction unit is prevented from correcting the first target control value, and the arbitration unit arbitrates between the first target control value not corrected by the correction unit and the second target control value.

The vehicle control apparatus as described above includes the first target control value setting unit to set the first target control value in response to the driver's request, the second target control value setting unit to set the second target control value in response to conditions different from the driver's request, and the arbitration unit, and controls the vehicle by using the arbitration unit to arbitrate between the first target control value and the second target control value. Further, the vehicle control apparatus includes the correction unit configured to correct the first target control value set by the first target control value setting unit such as to suppress the over-spring vibration of the vehicle. With this arrangement, the vibration of the vehicle is satisfactorily suppressed when the first target control value responsive to the driver's request is corrected by the correction unit. In this vehicle control apparatus, moreover, when the second target control value is set in response to conditions different from the driver's request, the correction unit is prevented from correcting the first target control value, and the arbitration unit arbitrates between the first target control value that is not corrected and the second target control value supplied from the second target control value setting unit.

In this manner, the vibration-suppression-&-correction process by the correction unit is prevented when the arbitration between the first and second target control values is performed, so that the vibration-suppression-&-correction process and the arbitration between the first and second target control values are prevented from helping increase the vibration of the vehicle to destabilize the behavior of the vehicle. Further, there is no need to design the second target control value setting unit in conformity with the correction unit when the correction unit is incorporated into the vehicle control apparatus. Accordingly, with this vehicle control apparatus, the vibration of the vehicle is suppressed satisfactorily, and the safety of the vehicle is easily and properly ensured when a target control value is set in response to conditions different from the driver's request.

Moreover, the vehicle control apparatus according to the present invention further includes a switching unit configured to selectively switch a destination of the first target control value set by the first target control value setting unit between the correction unit and the arbitration unit, wherein the switching unit supplies the first target control value directly to the arbitration unit without the correction unit serving as an intervening unit if the second target control value sets the second target control value.

Further, when the second target control value setting unit releases a setting of the second target control value, the correction unit may preferably receive a final output value of the arbitration unit that is output at a time the setting of the second target control value is released.

When the inputting of the first target control value into the correction unit is stopped by the switching unit upon the setting of the second target control value, the ultimate target drive force output from the vehicle control apparatus may become discontinuous to help increase the vibration of the vehicle around the time at which the first target control value is input again into the correction unit upon the release of the setting of the second target control value. If the final output value of the arbitration unit at the time the setting of the second target control value is released is input into the correction unit when the second target control value setting unit releases the setting of the second target control value, the ultimate target drive force of the vehicle control apparatus can have its continuity preserved at the time the setting of the second target control value by the second target control value setting unit is released, thereby stabilizing the behavior of the vehicle.

Moreover, the arbitration unit may select as its output value the smaller of the first target control value and the second target control value, which are substantially simultaneously supplied, or may select as its output value the larger of the first target control value and the second target control value, which are substantially simultaneously supplied. According to this arrangement, based on the travel condition and/or travel environment condition of the vehicle, an arbitration can properly be performed between the first target control value responsive to the driver's request and the second target control value responsive to conditions different from the driver's request Further, the second target control value setting unit may preferably be configured to set the second target control value in response to at least one of a travel condition of the vehicle and a travel environment of the vehicle such that the behavior of the vehicle is stabilized.

With this arrangement, the first target control value responsive to the driver's request and the second target control value set by the second target control value setting unit to stabilize the behavior of the vehicle irrespective of the driver's intention are properly arbitrated, thereby satisfactorily improving the safety of the vehicle travel.

According to another aspect of the present invention, a method of suppressing vibration of a vehicle by correcting, with a correction unit, a first target control value relating to a travel of the vehicle and set according to a driver's request such as to suppress over-spring vibration of the vehicle includes a step (a) of setting a second target control value in response to conditions different from the driver's request, a step (b) of preventing the correction unit from correcting the first target control value if the second target control value is set by the step (a), and a step (c) of arbitrating between the first target control value not corrected by the correction unit and the second target control value.

This vehicle-vibration-suppression method may preferably include a further step of supplying a final arbitration result of the step (c) to the correction unit when a setting of the second target control value is released, the final arbitration result being a result of the step (c) that is obtained at a time the setting of the second target control value is released.

According to another aspect of the present invention, a vehicle control apparatus for controlling a vehicle in response to a target control value that relates to a travel of the vehicle includes a first target control value setting unit configured to set a first target control value in response to a driver's request, a second target control value setting unit configured to set a second target control value in response to conditions different from a driver's request, and a correction unit configured to correct the first target control value set by the first target control value setting unit or the second target control value set by the second target control value setting unit such as to suppress over-spring vibration of the vehicle, wherein when the second target control value setting unit sets the second target control value, the first target control value is disabled, and the correction unit is prevented from correcting the second target control value under predetermined conditions.

The vehicle control apparatus described above includes the correction unit configured to correct the first target control value set by the first target control value setting unit or the second target control value set by the second target control value setting unit such as to suppress the over-spring vibration of the vehicle. With this arrangement, the vibration of the vehicle is satisfactorily suppressed when the first target control value responsive to the driver's request or the second target control value responsive to conditions different from the driver's request is corrected by the correction unit. Moreover, the vehicle control apparatus disables the first target control value and prevents the correction unit from correcting the second target control value in the event that predetermined conditions are satisfied, e.g., when the conditions to give priority to the second target control value over the first target control value are satisfied, if the second target control value setting unit sets the second target control value.

In this manner, the first target control value responsive to the driver's request is disabled and the second target control value responsive to conditions different from the driver's request is enabled under predetermined conditions, with the vibration-suppression-&-correction of the second target control value by the correction unit being prohibited, so that the vibration-suppression-&-correction process is prevented from helping increase the vibration of the vehicle to destabilize the behavior of the vehicle. Further, there is no need to design the second target control value setting unit in conformity with the correction unit when the correction unit is incorporated into the vehicle control apparatus. Accordingly, with this vehicle control apparatus, the vibration of the vehicle is suppressed satisfactorily, and the safety of the vehicle is easily and properly ensured when a target control value is set in response to conditions different from the driver's request.

The vehicle control apparatus may preferably further include a first switching unit configured to selectively enable one of the first target control value set by the first target control value setting unit and the second target control value set by the second target control value setting unit, and a second switching unit configured to control whether to supply the first target control value or second target control value output from the first switching unit to the correction unit.

Further, when the second target control value setting unit releases a setting of the second target control value, the correction unit may preferably receive a final setting value of the second target control value setting unit that is output at a time the setting of the second target control value is released.

As previously described, when the first target control value is disabled, the ultimate target drive force output from the vehicle control apparatus may become discontinuous to help increase the vibration of the vehicle around the time at which the first target control value is input again into the correction unit. If the final setting value of the second target control value setting unit at the time the setting of the second target control value is released is input into the correction unit when the second target control value setting unit releases the setting of the second target control value, the ultimate target drive force of the vehicle control apparatus can have its continuity preserved at the time the setting of the second target control value by the second target control value setting unit is released, thereby stabilizing the behavior of the vehicle.

Moreover, the second target control value setting unit may preferably be configured to set the second target control value in response to at least one of the driver's request, a travel condition of the vehicle, and a travel environment of the vehicle such that the driving of the vehicle is assisted or substituted for.

With this provision, the driving of the vehicle by the driver is properly assisted or substituted for by the vehicle control apparatus, thereby improving the safety of vehicle travel satisfactorily.

According to another aspect of the present invention, a method of suppressing vibration of a vehicle by correcting, with a correction unit, a first target control value relating to a travel of the vehicle and set according to a driver's request such as to suppress over-spring vibration of the vehicle includes a step (a) of setting a second target control value in response to conditions different from the driver's request, and a step (b) of disabling the first target control value and preventing the correction unit from correcting the second target control value under predetermined conditions if the second target control value is set by the step (a).

This vehicle-vibration-suppression method may preferably include a further step of supplying a final setting value of the step (a) to the correction unit when a setting of the second target control value is released, the final setting value being set by the step (a) at the time the setting of the second target control value is released.

According to at least one embodiment of the present invention, the vibration of the vehicle is suppressed satisfactorily, and the safety of the vehicle is easily and properly ensured when a target control value is set in response to conditions different from the driver's request.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENTS

In the following, the best mode for carrying out the present invention will be described in detail by referring to the accompanying drawings.

Figure 1:
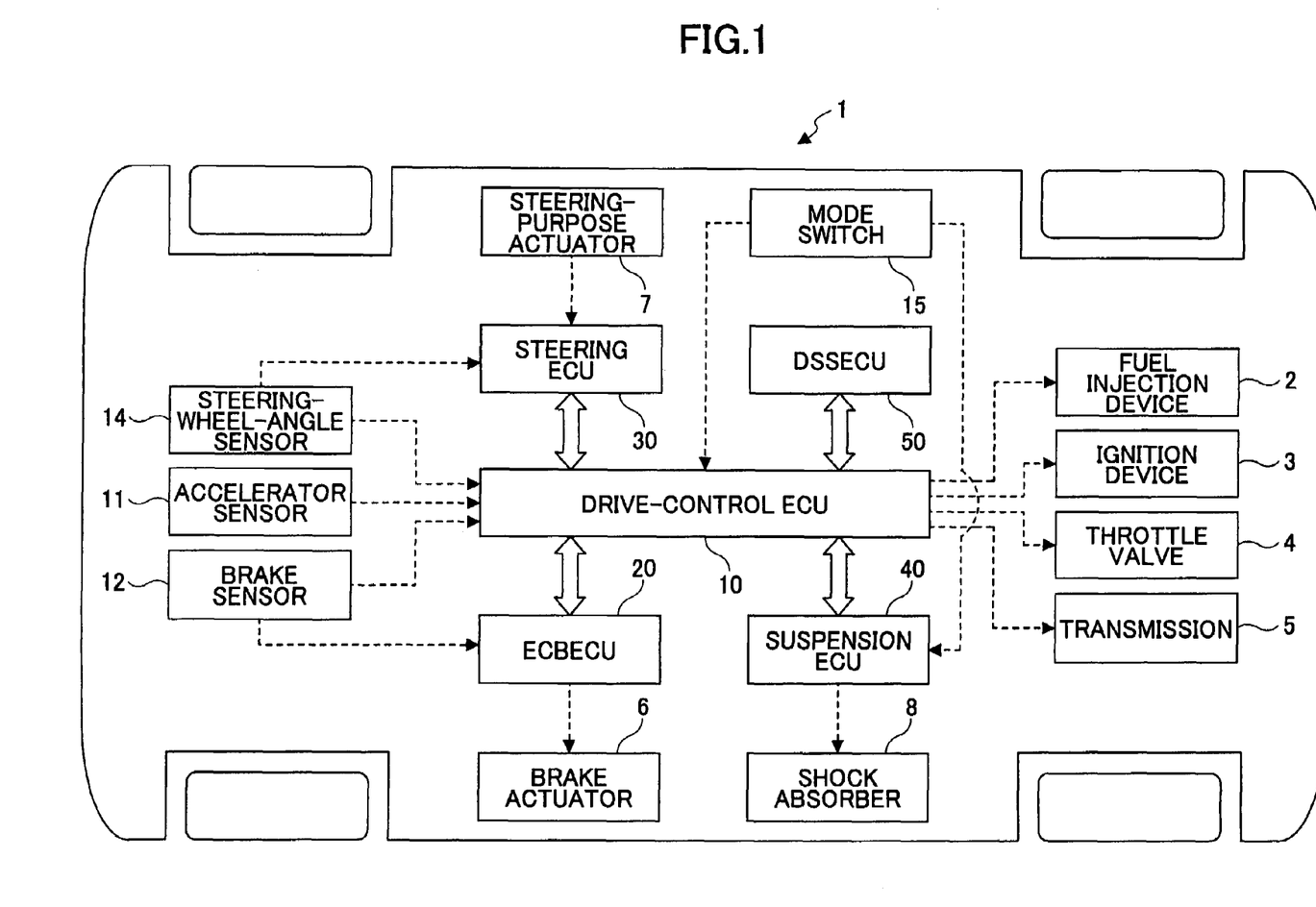
FIG. 1 is a block diagram showing a vehicle to which a vehicle control apparatus according to the present invention is applied.

FIG. 1 is a block diagram showing a vehicle to which a vehicle control apparatus according to the present invention is applied. In FIG. 1, a vehicle 1 includes an internal combustion engine (not shown) such as a gasoline engine or diesel engine as a source of a drive force for travel. This internal combustion engine includes devices such as a fuel injection device 2, an ignition device 3, an electronically controlled throttle valve 4 (hereinafter referred to simply as "throttle valve" 4). The vehicle 1 is also provided with a transmission 5 such as an automatic transmission or non-stage transmission for transmitting the drive force generated by the internal combustion engine to the drive wheels. Further, the vehicle 1 includes an electronically-controlled brake system inclusive of a brake actuator 6 electronically controlled in response to the displacement of the brake pedal, a steering apparatus inclusive of a steering-purpose actuator 7 such as a variable gear mechanism and electrical assisting unit electronically controlled in response to the operation of the steering wheel, and an electronically-controlled suspension inclusive of a plurality of shock absorbers 8 for changing an attenuating capability through electronic control.

The internal combustion engine and transmission 5 of the vehicle 1 are controlled by a drive-control-purpose electronic control unit 10 (hereinafter referred to as "drive-control ECU" (all electronic control units will hereinafter be referred to as "ECU")). The drive-control ECU 10 of this embodiment is implemented as a multi-processor unit, for example, and includes a plurality of CPUs for performing various computations, a ROM for storing various controls programs, a RAM for use as a work area for storing data and executing programs, an input/output interface, a memory device, etc. The drive-control ECU 10 is connected to an accelerator sensor 11, a brake sensor 12, and a steering-wheel-angle sensor 14.

The accelerator sensor 11 detects the displacement of the accelerator pedal given by the driver, and transmits a signal indicative of the detected value to the drive-control ECU 10. The brake sensor 12 detects the displacement of the brake pedal given by the driver, and transmits a signal indicative of the detected value to the drive-control ECU 10. The steering-wheel-angle sensor 14 detects the angle of the steering wheel indicative of the steering displacement given by the driver, and transmits a signal indicative of the detected value to the drive-control ECU 10. The drive-control ECU 10 controls the fuel injection device 2, the ignition device 3, the throttle valve 4, and the transmission 5 in response to the driver's request indicated by the signals from the sensors 11 through 14 and the detection values of other sensors (not shown) such as to satisfy the driver's request.

Further, the drive-control ECU 10 is also connected to a mode switch 15 serving as a travel-characteristics (travel-mode) determining means. The mode switch 15 is used when the attenuating capability of the shock absorbers 8 included in the electronically-controlled suspension system are switched. Operating the mode switch 15 makes it possible to change the travel characteristics, i.e., travel mode of the vehicle 1. In this embodiment, when the mode switch 15 is turned off by the driver, the attenuating capability of the shock absorbers 8 is set to a standard value, by which the travel characteristics of the vehicle 1 are set to a normal mode. When the mode switch 15 is turned on and set to "mode 1", the attenuating capability of the shock absorbers 8 is set to a harder value than the standard value, by which the travel characteristics of the vehicle 1 are set to a power mode. Under the power mode, acceleration performance is given priority over the vibration suppression of the vehicle 1. When the mode switch 15 is turned on and set to "mode 2", the attenuating capability of the shock absorbers 8 is set to a softer value than the standard value, by which the travel characteristics of the vehicle 1 are set to a comfort mode. Under the comfort mode, vibration suppression is given priority over the acceleration performance of the vehicle 1.

The drive-control ECU 10 is connected to an ECBECU 20, a steering ECU 30, a suspension ECU 40, and a DSSECU 50 through an on-vehicle LAN or wireless communication. The ECBECU 20 serves to control the electronically-controlled brake system, and controls the brake actuator 6 and the like in response to the detection values of various sensors including the brake sensor 12. In this embodiment, the ECBECU 20 is configured to perform a vehicle dynamics integrated management (VDIM) regarding the driving, steering, and breaking of the vehicle 1 such as to stabilize the behavior of the vehicle 1 by cooperating with the drive-control ECU 10, the steering ECU 30, and the suspension ECU 40.

The steering ECU 30 serves to control the steering mechanism of the vehicle 1, and controls the steering-purpose actuator 7 and the like in response to the detection values of various sensors including the steering-wheel-angle sensor 14. The suspension ECU 40 serves to control the electronically-controlled suspension, and controls the attenuating capability of each of the shock absorbers 8 in response to the setting of the mode switch 15 made by the driver. The DSSECU 50 serves to perform the overall control of drive assist and/or substitution for the driver, and functions as a cruise controller, a brake assist unit, and a crash prevention system (pre-crash safety system). Nonetheless to say, the drive-control ECU 10, the ECBECU 20, the steering ECU 30, the suspension ECU 40, and the DSSECU 50 receive the information necessary for control from various sensors such as a throttle openness sensor, a vehicle-speed sensor, a forward/backward accelerator sensor, a yaw-rate sensor, a raider unit, a monitor system for detecting an inter-vehicle distance, for example, a navigation system, a road traffic information communication system (VICS), a unit (surrounding information acquisition unit) for acquiring the travel conditions of the vehicle 1 such as an imaging unit or inter-vehicle-distance sensor for acquiring an inter-vehicle distance, etc.

Figure 2:
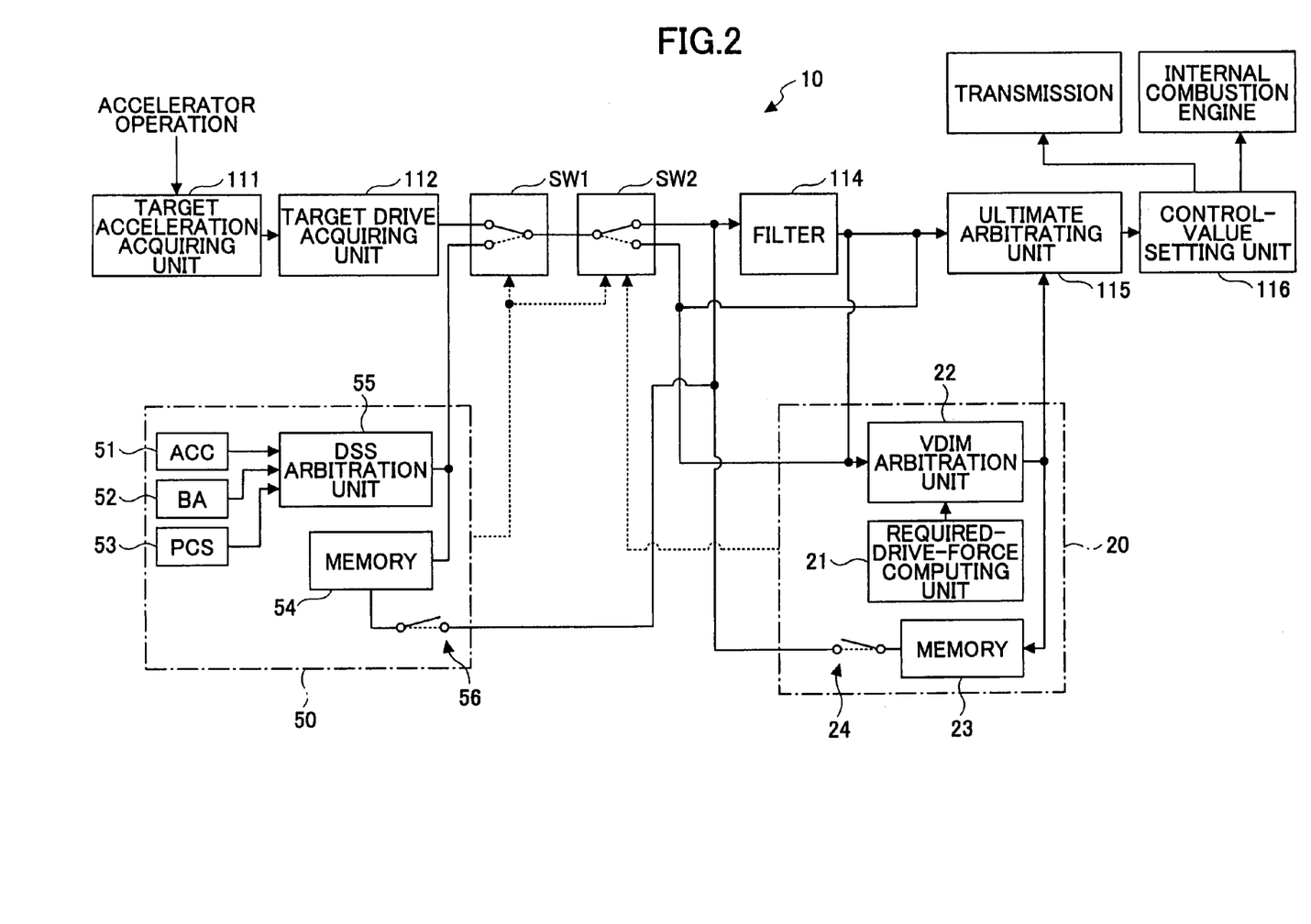
FIG. 2 is a control block diagram for explaining the procedure for controlling an internal combustion engine and transmitter according to the vehicle control apparatus of the present invention.

FIG. 2 is a control block diagram for explaining the procedure for controlling the internal combustion engine and transmitter of the vehicle 1. As can be seen from the figure, the internal combustion engine and the transmitter of the vehicle 1 is mainly controlled by the drive-control ECU 10, which cooperates according to need with at least one of the ECBECU 20 and the DSSECU 50. As shown in FIG. 2, the drive-control ECU 10 includes a target acceleration acquiring unit 111, a target drive acquiring unit 112, a first switching unit SW1, a second switching unit SW2, a filter 114, an ultimate arbitrating unit 115, and a control-value setting unit 116.

The target acceleration acquiring unit 111 uses a map or the like that defines the relationship between the target acceleration of the vehicle 1 and the displacement of the accelerator pedal given by the driver, thereby acquiring the target acceleration of the vehicle 1 responsive to the displacement of the accelerator pedal indicated by the signal supplied from the accelerator sensor 11, followed by supplying a signal indicative of the acquired value to the target drive acquiring unit 112. The target drive acquiring unit 112 uses a map or the like that defines the relationship between the target acceleration of the vehicle 1 and the target drive force of the internal combustion engine, thereby to acquire the target drive force of the internal combustion engine in response to the displacement of the accelerator pedal, i.e., the target acceleration acquired by the target acceleration acquiring unit 111. The output terminal of the target drive acquiring unit 112 is connected to one of the input nodes (drive-request side) of the first switching unit SW1.

The first switching unit SW1 has two input nodes as shown in FIG. 2, one (driver-request side) of the two input nodes being connected to the output terminal of the target drive acquiring unit 112 as described above, and the other (DSS side) being connected to the DSSECU 50. The first switching unit SW1 selects one of the signal from the target drive acquiring unit 112 and the signal from the DSSECU 50 as its output in response to an instruction from the DSSECU 50 or the like. Namely, the first switching unit SW1 outputs one of the signal from the target drive acquiring unit 112 and the signal from the DSSECU 50 as a valid signal. The output terminal of the first switching unit SW1 is connected to one of the input nodes of the second switching unit SW2. The first switching unit SW1 is usually set to select the deriver-request side, thereby supplying the output signal of the target drive acquiring unit 112 to the second switching unit SW2 during a normal operation.

The second switching unit SW2 has a filter-side node and a bypass-side node as output nodes as shown in FIG. 2.

Among these two output nodes, the filter-side node is connected to the input terminal of the filter 114. The bypass-side node is connected to the ultimate arbitrating unit 115 and the ECBECU 20 by bypassing the filter 114. The second switching unit SW2 selectively switches the destination of the output signal of the first switching unit SW1 between the filter side and the bypass side in response to an instruction from the ECBECU 20. The output terminal of the filter 114 is connected to the ultimate arbitrating unit 115 and the ECBECU 20.

With this arrangement, when the second switching unit SW2 is set to the filter side, the signal passing through the filter 114 is supplied to the ultimate arbitrating unit 115 and the ECBECU 20. On the other hand, when the second switching unit SW2 is set to the bypass side, the signal output from the first switching unit SW1 is supplied to the ultimate arbitrating unit 115 and ECBECU 20 without passing through the filter 114. The second switching unit SW2 is usually set to select the filter side, thereby supplying the output signal of the first switching unit SW1 to the filter 114 during a normal operation.

The filter 114 serves to correct the target drive force such as to suppress the over-spring vibration of the vehicle 1. In this embodiment, a second-order notch filter is used as the filter 114. The ultimate arbitrating unit 115 arbitrates between the signal supplied from the second switching unit SW2 and the signal supplied from the ECBECU 20, thereby setting an ultimate target drive force. In this embodiment, the ultimate arbitrating unit 115 performs a priority process for preferentially outputting one of the supplied signals in response to the travel conditions and/or travel-environment conditions of the vehicle 1, or performs a max-select process or minimum-select process for outputting the maximum value or minimum value of the signals that are almost simultaneously supplied.

Further, the control-value setting unit 116 determines the control values of the fuel injection device 2, the ignition device 3, the throttle valve 4, and the transmission 5 based on the output value of the ultimate arbitrating unit 115. The drive-control ECU 10 generates control signals for the fuel injection device 2, the ignition device 3, the throttle valve 4, and the transmission 5 based on the control values determined by the control-value setting unit 116, and supplies the generated control signals to respective devices. With this provision, the internal combustion engine and transmission 5 of the vehicle 1 are controlled such as to satisfy the requests from the driver, the ECBECU 20, and the DSSECU 50.

The reason why the filter 114 comprised of a second-order notch filter is provided for the drive-control ECU 10 of the present embodiment is as follows. If the vehicle 1 is a rear-wheel drive vehicle, the transfer function having the target drive force of the vehicle as its input and the rear suspension stroke of the vehicle as its output may generally be represented as a second-order/fourth-order transfer function as shown in formula (1).

$$Px_r(s) = K \cdot \frac{\omega_{n1}^2 \cdot \omega_{n2}^2}{z_1 \cdot z_2} \cdot \frac{s - z_1}{s^2 + 2\xi_1 \cdot \omega_{n1} \cdot s + \omega_{n1}^2} \cdot \frac{s - z_2}{s^2 + 2\xi_2 \cdot \omega_{n2} \cdot s + \omega_{n2}^2} \quad (1)$$
$$= K \cdot G_1(s) \cdot G_2(s)$$

Such second-order/fourth-order transfer function includes two second-order transfer functions $G_1(s)$ and $G_2(s)$. As the formula (1) is identified, the value of the attenuation ratio $\xi_1$ of the second-order transfer function $G_1(s)$ on the left-hand-side term becomes vibration inductive while the value of the attenuation ratio $\xi_2$ of the second-order transfer function $G_2(s)$ on the right-hand-side term becomes vibration non-inductive. As a result, the second-order transfer function $G_2(s)$ on the right-hand-side term of the formula (1) becomes vibration non-inductive while the second-order transfer function $G_1(s)$ on the left-hand-side term becomes vibration inductive. Accordingly, the vibration of the vehicle 1 can be suppressed by correcting a target drive force Pt serving as the target control value by use of the filter 114 comprised of a second-order notch filter that cancels the poles of the second-order transfer function $G_1(s)$ inducing vibration contained in the second-order/fourth order transfer function of the formula (1).

The second-order notch filter that cancels the poles of the second-order transfer function $G_1(s)$ of the formula (1) assumes a form of a second-order/second-order transfer function. With the standard frequency being ωm, the standard attenuation ratio being ζm, the plant frequency of the drive system of the vehicle 1 serving as a plant being ωp, and the plant attenuation ratio being ζp, such a second-order notch filter is represented by the following formula (2). In consideration of this, the drive-control ECU 10 is provided with the filter 114 that corrects the target drive force according to the correction formula (2).

$$C(s) = \frac{s^2 + 2\xi_p \cdot \omega_p \cdot s + \omega_p^2}{s^2 + 2\xi_m \cdot \omega_m \cdot s + \omega_m^2} \quad (2)$$

In this case, parameters such as the standard frequency ωm, the standard attenuation ratio ζm, the plant frequency ωp, and the plant attenuation ratio ζp assume values that vary in response to changes in the travel characteristics, i.e., travel mode of the vehicle 1, the travel conditions and/or travel environment of the vehicle 1, etc. Accordingly, parameters such as the standard frequency ωm, the standard attenuation ratio ζm, the plant frequency ωp, and the plant attenuation ratio ζp that define the attenuation characteristics of the filter 114 may be changed in response to the travel mode of the vehicle 1 set by the driver and the travel condition and/or travel environment of the vehicle 1. With this arrangement, it is possible to suppress the vibration of the vehicle 1 satisfactorily at all times.

Instead of changing parameters such as the standard frequency ωm, the standard attenuation ratio ζm, the plant frequency cop, and the plant attenuation ratio ζp for a single filter 114, a set of second-order notch filters having respective, different attenuation characteristics may be employed. In this case, the values of the standard frequency ωm, standard attenuation ratio ζm, plant frequency ωp, and plant attenuation ratio ζp may be varied between the filters constituting the filter set, and provision may be made such that an optimum one of the filters in the filter set is selected during the travel motion of the vehicle 1 in response to the travel mode set by the driver and the travel condition and/or travel environment of the vehicle obtained from the various sensors and navigation system and the like. As the filters having differing attenuation characteristics are switched as appropriate, it is possible to achieve better responsiveness compared to the case in which the parameters of a single filter are changed in response to the travel mode and the like, for example.

The DSSECU 50 that cooperates with the drive-control ECU 10 for the control of the vehicle 1 includes an ACC module 51, a BA module 52, a PCS module 53, and a DSS arbitration unit 55 as shown in FIG. 2. The ACC module 51 serves as a cruise controller so as to assist and/or substitute for the driving of the vehicle 1 in response to a request from the driver. When the driver requests to enable the cruise control, the ACC module 51 obtains the drive force necessary for the cruise control in response to the signals from the various sensors and environment (surrounding) information acquiring unit, and supplies a signal indicative of the obtained drive force (required drive force) to the DSS arbitration unit 55.

The BA module 52 serves as a brake assist unit. When it is determined that brake assist is necessary, the BA module 52 obtains the drive force necessary for the brake assist in response to the signals from the various sensors and environment (surrounding) information acquiring unit, and supplies a signal indicative of the obtained drive force (required drive force) to the DSS arbitration unit 55. The PCS module 53 serves as a collision prevention system (pre-crash safety system). When it is determined that there is a need to avoid the collision of the vehicle 1, the PCS module 53 obtains the drive force necessary for the avoidance of the collision in response to the signals from the various sensors and environment (surrounding) information acquiring unit, and supplies a signal indicative of the obtained drive force (required drive force) to the DSS arbitration unit 55.

The DSS arbitration unit 55 arbitrates the signals from the ACC module 51, the BA module 52, and the PCS module 53 so as to set the target drive force of the DSSECU 50. In this manner, the DSS arbitration unit 55 serves as a unit (second target control value setting unit) for setting a target drive force (second target control value) such that the driving of the vehicle 1 is assisted or substituted for in response to at least one of the driver's request, the travel condition of the vehicle 1, and the travel environment of the vehicle 1. With this provision, the driving of the vehicle 1 is properly assisted or substituted for, thereby improving the safety of vehicle travel satisfactorily. The arbitration performed by the DSS arbitration unit 55 includes a priority process for preferentially outputting one of the signals supplied from the modules 51 through 53 and a max-select process or minimum-select process for outputting the maximum value or minimum value of the signals that are almost simultaneously supplied from the modules 51 through 53.

Further, the DSSECU 50 includes a memory 54 for storing the output value of the DSS arbitration unit 55 as shown in FIG. 2, and the memory 54 is connected to the input terminal of the filter 114 via a switch 56. When the switch 56 is turned on, the output value of the DSS arbitration unit 55 stored in the memory 54 is supplied to the filter 114.

The ECBECU 20 that cooperates with the drive-control ECU 10 for the control of the vehicle 1 also performs the control functions to stabilize the behavior of the vehicle 1 as described above, and includes a required-drive-force computing unit 21 and a VDIM arbitration unit 22. When it is determined that the behavior of the vehicle 1 becomes unstable, the required-drive-force computing unit 21 obtains the drive force necessary to stabilize the behavior of the vehicle 1 in response to the signals from the various sensors and environment (surrounding) information acquiring unit, and supplies a signal indicative of the obtained drive force (target drive force) to the VDIM arbitration unit 22. In this manner, the required-drive-force computing unit 21 serves as a unit (second target control value setting unit) for setting a target drive force (second target control value) such that the behavior of the vehicle 1 is stabilized in response to at least one of the travel condition of the vehicle 1 and the travel environment of the vehicle 1.

In response to the travel conditions or travel environment conditions of the vehicle 1, the VDIM arbitration unit 22 usually sets, as its output value serving a target driving force, the larger (maximum value: max select) or smaller (minimum value: minimum select) of the target drive force supplied from the filter 114 or from the second switching unit SW2, or the required drive force supplied from the required-drive-force computing unit 21. With this provision, the target drive force set according to the driver's request or set by the DSSECU 50 and the target drive force set by the required-drive-force computing unit 21 to stabilize the behavior of the vehicle irrespective of the driver's intention are properly arbitrated by taking into account the travel conditions, travel environment conditions, and so on of the vehicle 1, thereby satisfactorily improving the safety of the vehicle travel. The arbitration performed by the VDIM arbitration unit 22 also includes a priority process for preferentially outputting one of the supplied signals.

Further, the ECBECU 20 includes a memory 23 for storing the output value of the VDIM arbitration unit 22 as shown in FIG. 2, and the memory 23 is connected to the input terminal of the filter 114 via a switch 24. When the switch 24 is turned on, the output value of the VDIM arbitration unit 22 stored in the memory 23 is supplied to the filter 114.

In the vehicle 1 configured as described above, the first switching unit SW1 and second switching unit SW2 of the drive-control ECU 10 are switched as appropriate in response to the travel conditions, travel environments, and so on of the vehicle 1, thereby to perform a proper arbitration between the target drive force (first target drive force) set according to the driver's request and the target drive force (second target drive force) set by the ECBECU 20 and/or the DSSECU 50. In the following, the procedure for switching the first switching unit SW1 and the second switching unit SW2 will be described with reference to FIG. 3 through FIG. 9.

Figure 3:
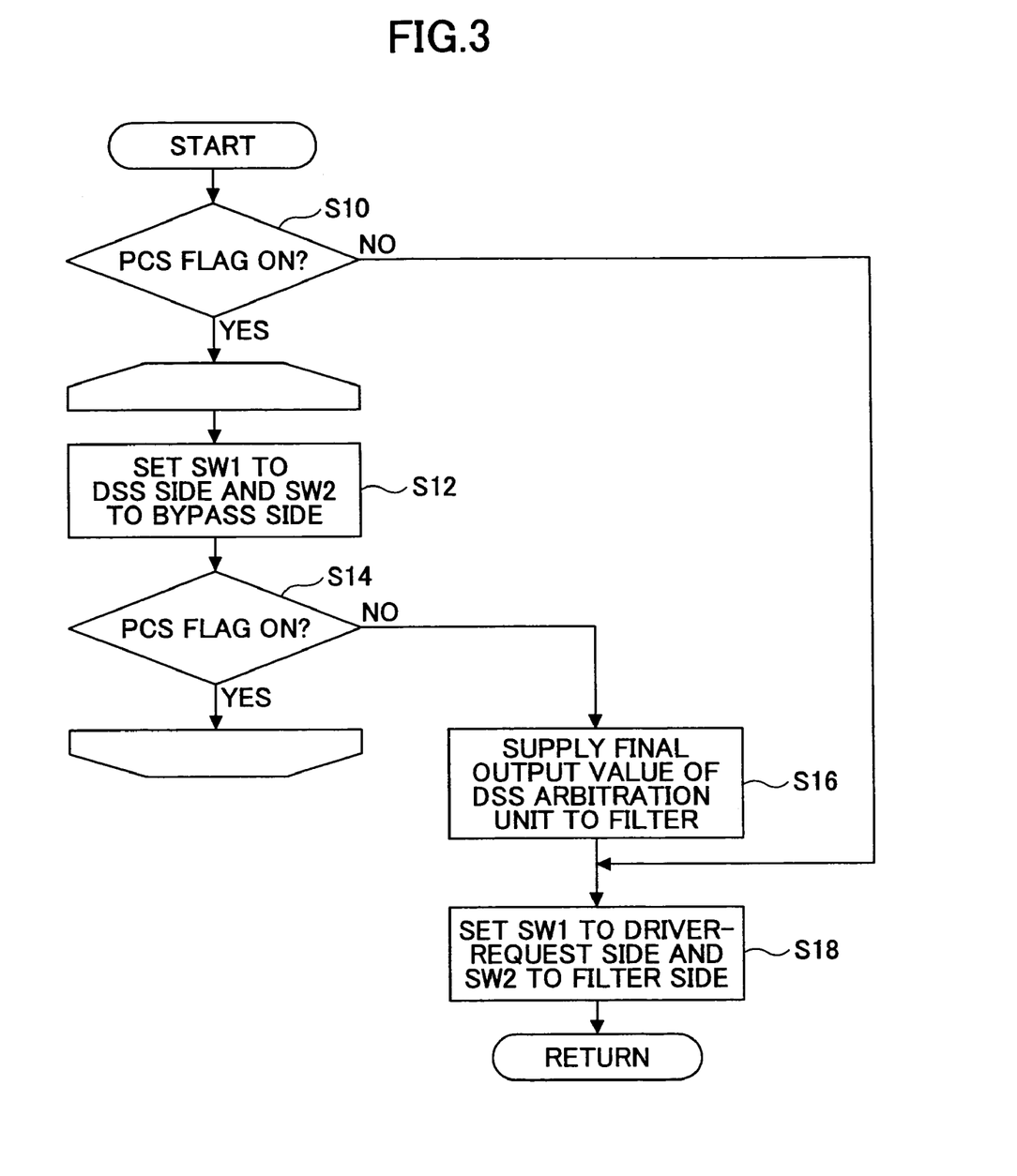
FIG. 3 is a flowchart for explaining the procedure for controlling a vehicle according to the vehicle control apparatus of the present invention.

FIG. 3 is a flowchart for explaining the procedure for switching the first switching unit SW1 and the second switching unit SW2 when the target drive force is set by the DSSECU 50. A routine shown in FIG. 3 is repeatedly performed at constant intervals during the travel motion of the vehicle 1. When the time comes to perform this routine, the drive-control ECU 10 checks (S10) whether a PCS flag is set "ON" where the PCS flag is set "ON" when the DSSECU 50 determines that the process to prevent the collision of the vehicle 1 is necessary.

If it is determined that the PCS flag is set to "ON" (Yes at S10), the first switching unit SW1 in the drive-control ECU 10 is set to the DSS side (as shown by a dotted line in FIG. 2), and the second switching unit SW2 is set to the bypass side (as shown by a dotted line in FIG. 2) (S12). With this arrangement, the DSS arbitration unit 55 of the DSSECU 50 and the second switching unit SW2 are connected via the first switching unit SW1, so that the target drive force set according to the driver's request supplied from the target drive acquiring unit 112 is disabled, and the target drive force supplied from the DSSECU 50 (i.e., the target drive force set to avoid a collision by the PCS module in this case) is supplied to the second switching unit SW2. Since the second switching unit SW2 is set to the bypass side, the filter 114 is bypassed, so that the target drive force from the DSSECU 50 is supplied to the VDIM arbitration unit 22 of the ECBECU 20 and to the ultimate arbitrating unit 115 without passing through the filter 114.

In the present invention, if the DSSECU 50 requests collision prevention, and the ECBECU 20 requests behavior stabilization, the VDIM arbitration unit 22 gives priority to the collision prevention request issued by the DSSECU 50. Accordingly, the VDIM arbitration unit 22 and the ultimate arbitrating unit 115 output the target drive force set by the DSSECU 50, so that the ultimate target drive force set by the ultimate arbitrating unit 115 is equal to the target drive force set by the DSSECU 50.

In this manner, when the DSSECU 50 requests collision prevention, and the conditions are satisfied to give priority to the target drive force set by the DSSECU 50 over the target drive force set according to the driver's request, the target drive force according to the driver's request is disabled, and the target drive force set by the DSSECU 50 reflecting conditions different from the driver's request is enabled, with the vibration-suppression-&-correction process of the filter 114 being disabled with respect to the target drive force from the DSSECU 50. With this arrangement, it is avoided to help increase the vibration of the vehicle 1 through the vibration-suppression-&-correction process of the filter 114 thereby to destabilize the behavior of the vehicle 1. Further, there is no need to design the DSS arbitration unit 55 and the like of the DSSECU 50 in conformity to the filter 114 when the filter 114 is to be incorporated into the drive-control ECU 10. Accordingly, the vibration of the vehicle 1 is suppressed satisfactorily, and the safety of the vehicle 1 is easily and properly ensured when a target control value is set in response to conditions different from the driver's request.

Upon the performing of the process at step S12, the drive-control ECU 10 checks whether the PCS flag is set to "ON" (S14). If it is determined that the PCS flag is set to "ON" (Yes at S14), the processes at S12 and onwards are performed again, so that the first switching unit SW1 is set to the DSS side, and the second switching unit SW2 is set to the bypass side. While the processes at S12 and S14 are repeatedly performed, the collision of the vehicle 1 is avoided, resulting in the PCS flag being set to "OFF". Upon the detection of the "OFF" state of the PCS flag (No at S14), the DSSECU 50 turns on the switch 56, so that the final output value of the DSS arbitration unit 55 at the time the PCS flag is set to "OFF", i.e., at the time the setting of the target drive force by the DSSECU 50 is released (disabled), is supplied to the filter 114 (S16).

Figure 4A:
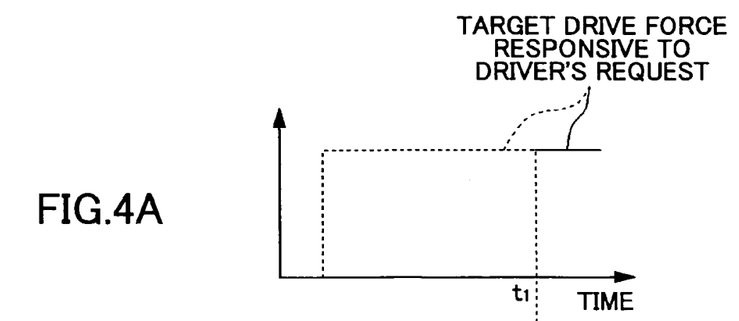
FIGS. 4A through 4D are drawings for explaining the procedure for setting a target drive force in the vehicle control apparatus of the present invention.
Figure 4B:
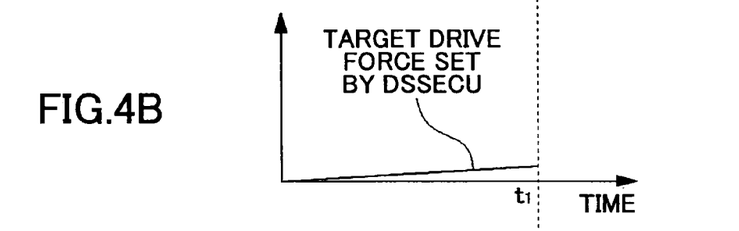

If it is assumed that the target drive force set according to the driver's request output from the target drive acquiring unit 112 is as shown in FIG. 4A, and the target drive force output from the DSSECU 50 is as shown in FIG. 4B, with the PCS flag being set to "OFF" at time $t_1$, the target drive force from the DSSECU 50 shown in FIG. 4B is enabled until the time $t_1$. In this case, the first switching unit SW1 and second switching unit SW2 may be switched immediately at the time $t_1$ at which the PCS flag is set to "OFF" to supply the output signal of the target drive acquiring unit 112 to the filter 114. If this is done, however, the ultimate target drive force output from the ultimate arbitrating unit 115 may become discontinuous around the time (time $t_1$) at which the target drive force of the target drive acquiring unit 112 is supplied to the filter 114 since no signal input is given to the filter 114 until the time $t_1$.

Figure 4C:
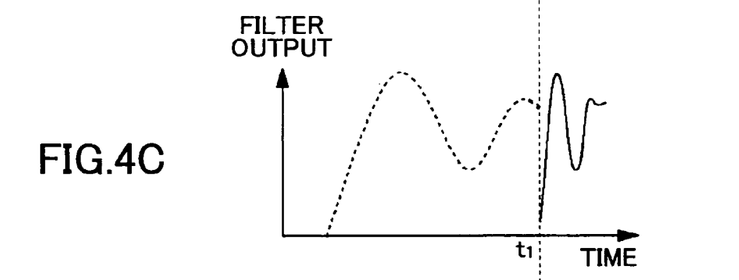
Figure 4D:
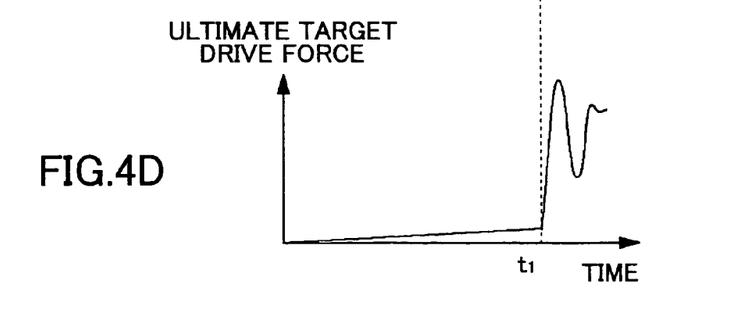

On the other hand, if the final output of the DSS arbitration unit 55 at the time the PCS flag is set to "OFF", i.e., at the time the setting of the target drive force by the DSSECU 50 is released, is supplied to the filter 114 as an initial value at the time (time $t_1$) the PCS flag is set to "OFF" as shown in FIG. 4C, then, the continuity of the target drive force output from the ultimate arbitrating unit 115 can be preserved as shown in FIG. 4D. With this provision, it is possible to satisfactorily suppress the destabilization of the behavior of the vehicle 1 even when the vibration-suppression-&-correction process by the filter 114 is disabled.

Upon the performing of the process at step S16, the first switching unit SW1 in the drive-control ECU 10 is set to the driver-request side (as shown by a solid line in FIG. 2), and the second switching unit SW2 is set to the filter side (as shown by a solid line in FIG. 2) (S18). As a result, the vibration-suppression-&-correction process by the filter 114 is performed with respect to the target drive force that is set according to the driver's request, thereby satisfactorily suppressing the vibration of the vehicle 1. After the process at step S18 is performed, the processes at step S10 and onwards will be performed repeatedly. If it is determined at step S10 that the PCS flag is set to "OFF" (No at S10), the first switching unit SW1 is set to the driver-request side at step S18, and the second switching unit SW2 is set to the filter side.

Figure 5:
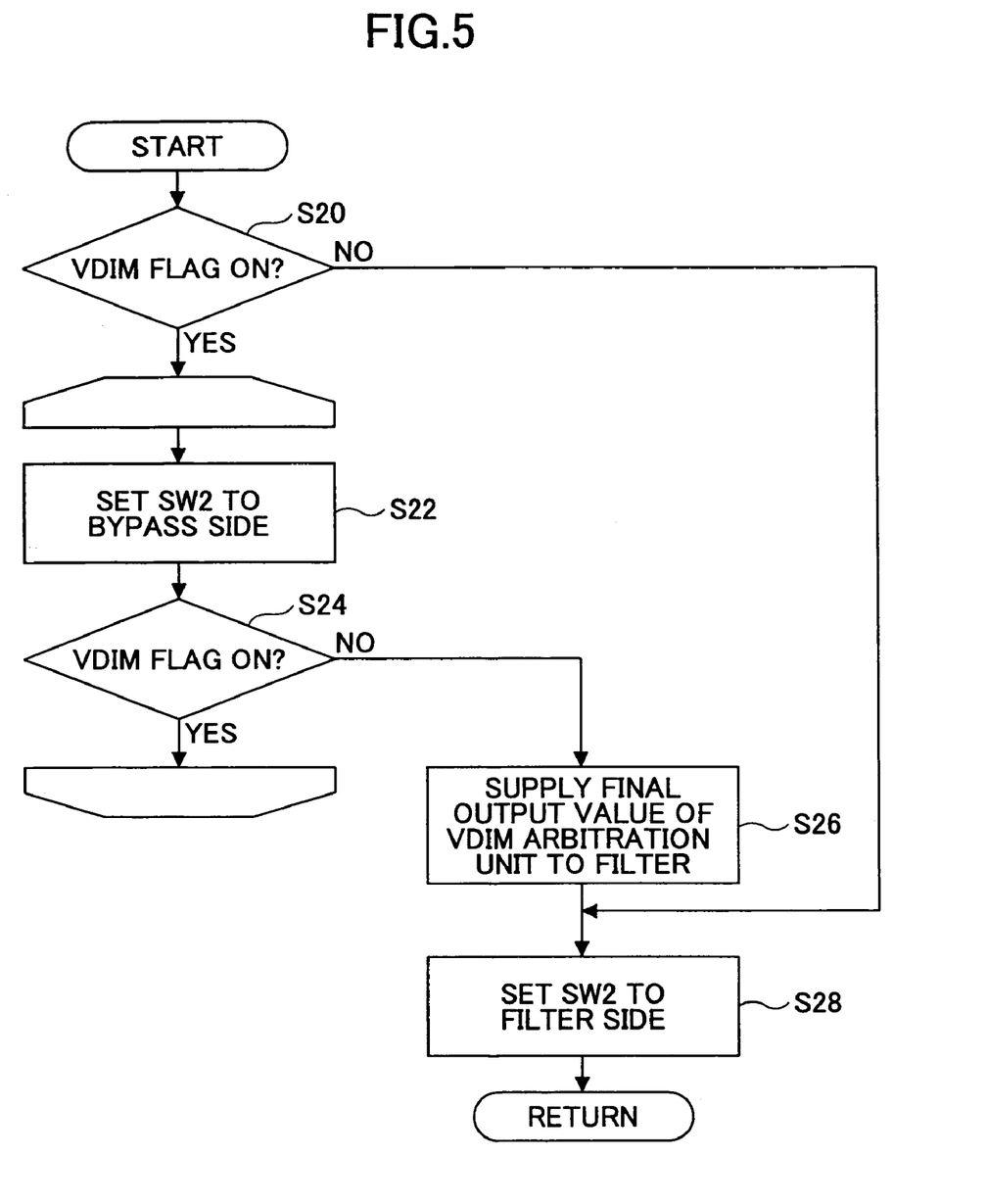
FIG. 5 is a flowchart for explaining the procedure for controlling a vehicle according to the vehicle control apparatus of the present invention.

FIG. 5 is a flowchart for explaining the procedure for switching the second switching unit SW2 when the target drive force is set by the ECBECU 20. A routine shown in FIG. 5 is repeatedly performed at constant intervals during the travel motion of the vehicle 1. When the time comes to perform this routine, the drive-control ECU 10 checks (S20) whether a VDIM flag is set to "ON" where the VDIM flag is set to "ON" when the ECBECU 20 determines that there is a need to stabilize the behavior of the vehicle 1.

If it is determined that the VDIM flag is set to "ON" (Yes at S20), the second switching unit SW2 in the drive-control ECU 10 is set to the bypass side (as shown by a dotted line in FIG. 2) (S22). As a result, the filter 114 is bypassed, so that the signal supplied from the first switching unit SW1 is supplied from the second switching unit SW2 to the VDIM arbitration unit 22 of the ECBECU 20 and to the ultimate arbitrating unit 115 without passing through the filter 114. The VDIM arbitration unit 22 then arbitrates between the target drive force computed by the required-drive-force computing unit 21 and the target drive force subjected to no vibration suppression and correction by the filter 114 supplied from the target drive acquiring unit 112 or DSSECU 50. Further, the ultimate arbitrating unit 115 arbitrates between the target drive force set by the VDIM arbitration unit 22 of the ECBECU 20 and the target drive force subjected to no vibration suppression and correction by the filter 114 supplied from the target drive acquiring unit 112 or DSSECU 50.

In this embodiment, when the ECBECU 20 requests to suppress the drive force of the vehicle 1, the VDIM arbitration unit 22 sets, as its output value serving as a target drive force, the smaller (minimum select) of the target drive force from the drive-control ECU 10 or the target drive force from the required-drive-force computing unit 21. Further, when the ECBECU 20 requests to increase the drive force of the vehicle 1, the VDIM arbitration unit 22 sets, as its output value serving as a target drive force, the greater (max select) of the target drive force from the drive-control ECU 10 or the requested drive force from the required-drive-force computing unit 21. In such arbitration process, the vibration of the vehicle 1 may be encouraged to increase so as to destabilize the behavior of the vehicle 1 if the arbitration is performed between the target drive force from the required-drive-force computing unit 21 and the target drive force for which a vibration-suppression-&-correction process by the filter 114 is performed.

Figure 6A:
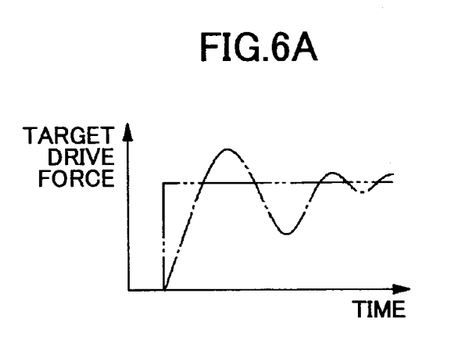
FIGS. 6A and 6B are drawings for explaining an ultimate target control value when an arbitration is performed between a target control value subjected to a vibration-suppression-&-correction process by a filter and a target control value set according to conditions different from the former target control value.
Figure 6B:
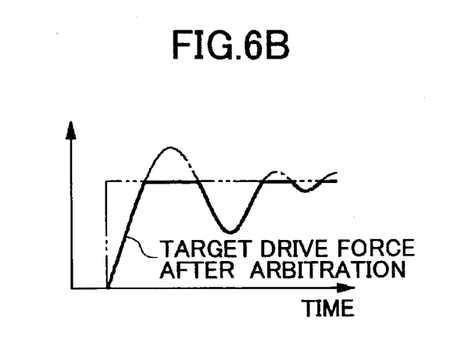

Namely, when the ECBECU 20 requests to suppress the drive force of the vehicle 1, the target drive force from the target drive acquiring unit 112 or DSSECU 50 subjected to vibration suppression and correction by the filter 114 may be as shown by a single-dot chain line in FIG. 6A, and the target drive force computed by the required-drive-force computing unit 21 may be as shown by a double-dot chain line in FIG. 6A. In such a case, the target drive force after arbitration performed based on the minimum-select method will be as shown by a solid line in FIG. 6B an arbitration based on the minimum-select method is performed When the vehicle 1 is controlled based on the target control value as shown by the solid line in FIG. 6B, not only the vibration suppression effect by the filter 114 is absent, but also the vibration of the vehicle 1 may be encouraged to increase.

Figure 7A:
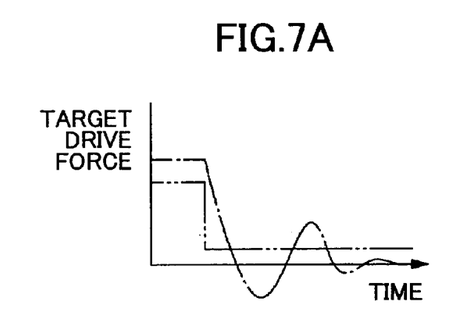
FIGS. 7A and 7B are drawings for explaining an ultimate target control value when an arbitration is performed between a target control value subjected to a vibration-suppression-&-correction process by a filter and a target control value set according to conditions different from the former target control value.
Figure 7B:
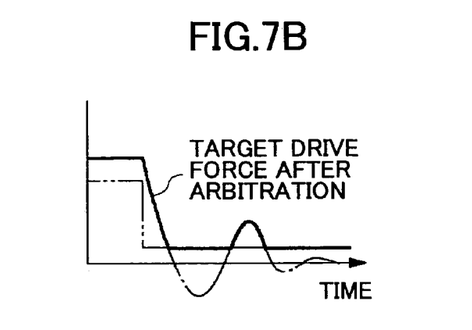

By the same token, when the ECBECU 20 requests to increase the drive force of the vehicle 1, the target drive force from the target drive acquiring unit 112 or DSSECU 50 subjected to vibration suppression and correction by the filter 114 may be as shown by a single-dot chain line in FIG. 7A, and the target drive force computed by the required-drive-force computing unit 21 may be as shown by a double-dot chain line in FIG. 7A. In such a case, the target drive force after arbitration performed based on the max-select method will be as shown by a solid line in FIG. 7B an arbitration based on the minimum-select method is performed When the vehicle 1 is controlled based on the target control value as shown by the solid line in FIG. 7B, not only the vibration suppression effect by the filter 114 is absent, but also the vibration of the vehicle 1 may be encouraged to increase.

In consideration of this, the present embodiment prohibits the filter 114 from correcting a target drive force (first target control value) supplied from the target drive acquiring unit 112 or from the DSSECU 50 if the target drive force (second target control value) is set by the required-drive-force computing unit 21 of the ECBECU 20 based on conditions different from the driver's request. Arbitration is thus performed between the non-corrected target drive force supplied from the target drive acquiring unit 112 or DSSECU 50 and the target drive force supplied from the required-drive-force computing unit 21. This prevents the vibration-suppression-&-correction process by the filter 114 and/or the arbitration of the target drive forces by the VDIM arbitration unit 22 from helping increase the vibration of the vehicle 1 so as to destabilize the behavior of the vehicle 1. Since the vibration-suppression-&-correction process by the filter 114 is prohibited, there is no need to design the VDIM arbitration unit 22 and the like of the ECBECU 20 in conformity to the filter 114 when the filter 114 is to be incorporated into the drive-control ECU 10. Accordingly, the vibration of the vehicle 1 is suppressed satisfactorily, and the safety of the vehicle 1 is easily and properly ensured when a target control value is set in response to conditions different from the driver's request.

It should be noted that the ultimate arbitrating unit 115 usually performs a minimum-select arbitration if the ECBECU 20 requests to suppress the drive force of the vehicle 1 and if the VDIM arbitration unit 22 performs a minimum-select arbitration. Further, the ultimate arbitrating unit 115 usually performs a max-select arbitration if the ECBECU 20 requests to increase the drive force of the vehicle 1 and if the VDIM arbitration unit 22 performs a max-select arbitration.

The reason why the ultimate arbitrating unit 115 is provided at a stage following the VDIM arbitration unit 22 in the present embodiment is as follows. With the presence of the ultimate arbitrating unit 115, a minimum-select arbitration will be performed by the ultimate arbitrating unit 115 even if the communication between the drive-control ECU 10 and the ECBECU 20 fails while the VDIM arbitration unit 22 performs a minimum-select arbitration. This ensures that the target drive force will not be larger than necessary. With this arrangement, it is possible to ensure the safety of vehicle travel satisfactorily. Even if the communication between the drive-control ECU 10 and the ECBECU 20 fails while the VDIM arbitration unit 22 performs a max-select arbitration, the ultimate arbitrating unit 115 will perform a max-select arbitration, thereby ensuring that at least the target drive force required by the driver is secured.

Upon the performing of the process at step S22, the drive-control ECU 10 checks whether the VDIM flag is set to "ON" (S24). If it is determined that the VDIM flag is set to "ON" (Yes at S24), the processes at S22 and onwards are performed again, so that the second switching unit SW2 is set to the bypass side. While the processes at S22 and S24 are repeatedly performed, the behavior of the vehicle 1 is stabilized, resulting in the VDIM flag being set to "OFF". Upon the detection of the "OFF" state of the VDIM flag (No at S24), the ECBECU 20 turns on the switch 24, so that the final output value of the VDIM arbitration unit 22 at the time the VDIM flag is set to "OFF", i.e., at the time the setting of the target drive force by the required-drive-force computing unit 21 is released (disabled), is supplied to the filter 114 (S26).

Figure 8A:
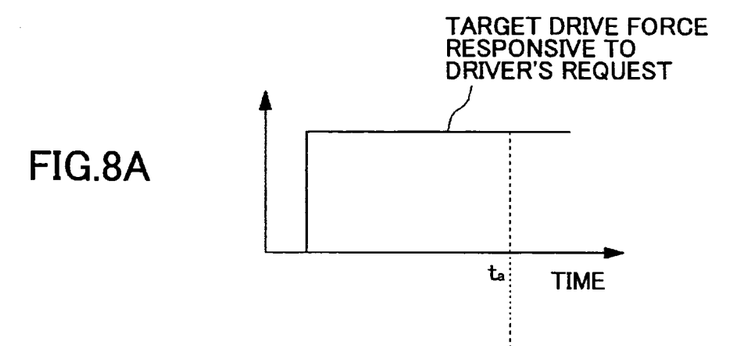
FIGS. 8A through 8D are drawings for explaining the procedure for setting a target drive force in the vehicle control apparatus of the present invention.
Figure 8B:
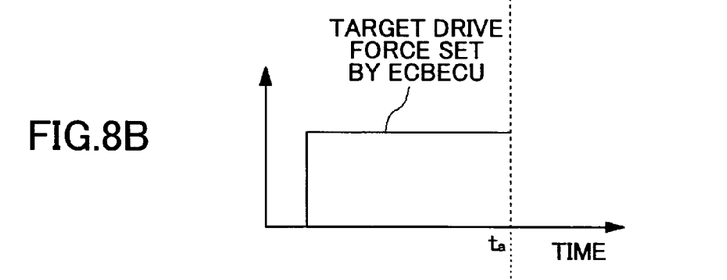

If it is assumed that the target drive force set according to the driver's request output from the target drive acquiring unit 112 is as shown in FIG. 8A, and the target drive force output from the required-drive-force computing unit 21 upon the request to suppress the drive force in the ECBECU 20 (which is smaller than the target drive force set according to the driver's request in the example shown in FIG. 8A) is as shown in FIG. 8B, with the VDIM flag being set to "OFF" at time $t_a$, the target drive force from the ECBECU 20 shown in FIG. 8B is enabled according to the minimum-select method until the time $t_a$. In this case, the second switching unit SW2 may be switched immediately to the filter side at the time $t_a$ at which the VDIM flag is set to "OFF" to supply the output signal of the target drive acquiring unit 112 to the filter 114. If this is done, however, the ultimate target drive force output from the ultimate arbitrating unit 115 may become discontinuous around the time (time $t_a$) at which the target drive force of the target drive acquiring unit 112 is supplied to the filter 114 since no signal input is given to the filter 114 until the time $t_a$.

Figure 9A:
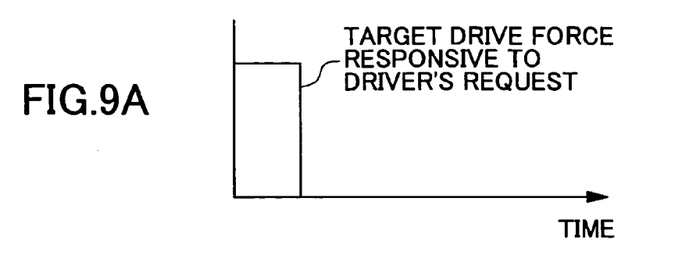
FIGS. 9A through 9D are drawings for explaining the procedure for setting a target drive force in the vehicle control apparatus of the present invention.
Figure 9B:
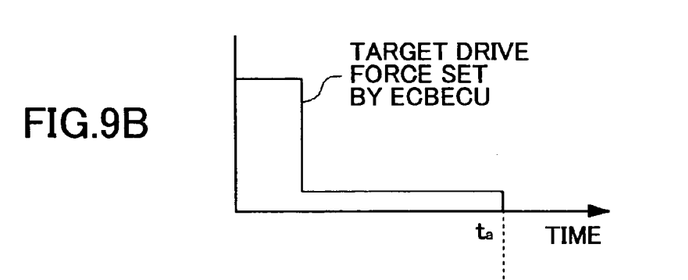

By the same token, If it is assumed that the target drive force set according to the driver's request output from the target drive acquiring unit 112 is as shown in FIG. 9A, and the target drive force output from the required-drive-force computing unit 21 upon the request to increase the drive force in the ECBECU 20 (which is larger than the target drive force set according to the driver's request in the example shown in FIG. 9A) is as shown in FIG. 9B, with the VDIM flag being set to "OFF" at time $t_a$, the target drive force from the ECBECU 20 shown in FIG. 9B is enabled according to the max-select method until the time $t_a$. In this case, the second switching unit SW2 may be switched immediately to the filter side at the time $t_a$ at which the VDIM flag is set to "OFF" to supply the output signal of the target drive acquiring unit 112 to the filter 114. If this is done, however, the ultimate target drive force output from the ultimate arbitrating unit 115 may become discontinuous around the time (time $t_a$) at which the target drive force of the target drive acquiring unit 112 is supplied to the filter 114 since no signal input is given to the filter 114 until the time $t_a$.

Figure 8C:
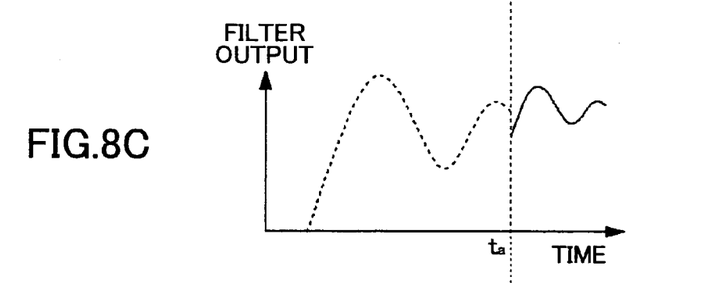
Figure 8D:
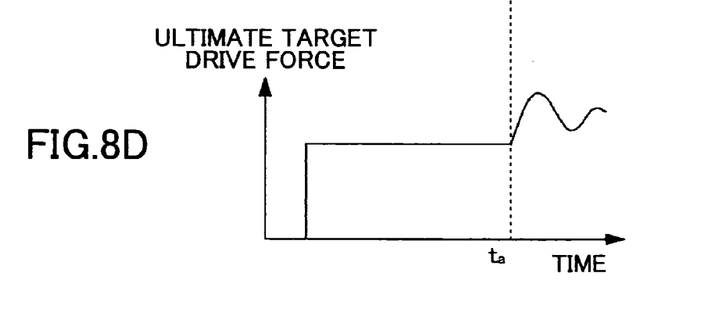
Figure 9C:
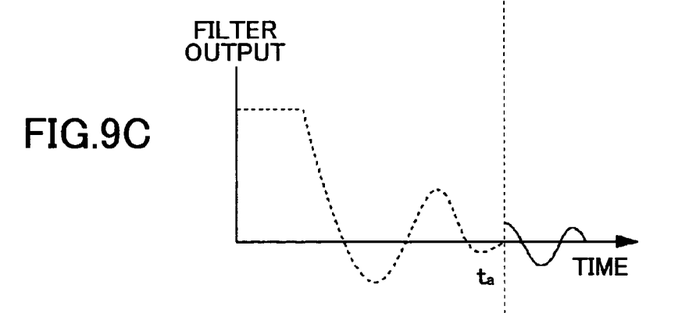
Figure 9D:
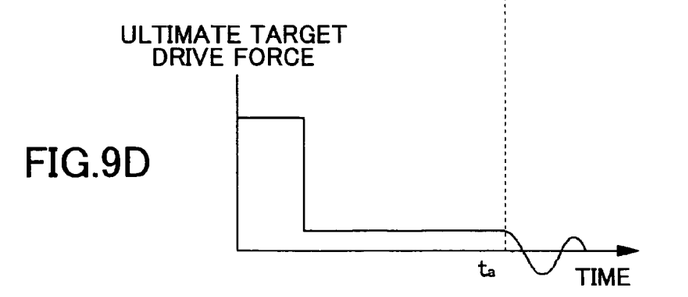

On the other hand, if the final output of the VDIM arbitration unit 22 at the time the VDIM flag is set to "OFF", i.e., at the time the setting of the target drive force by the ECBECU 20 is released, is supplied to the filter 114 as an initial value at the time (time $t_a$) the VDIM flag is detected as being "OFF" (No at S24) as shown in FIG. 8C or FIG. 9C, then, the continuity of the target drive force output from the ultimate arbitrating unit 115 can be preserved as shown in FIG. 8D or FIG. 9D. With this provision, it is possible to satisfactorily suppress the destabilization of the behavior of the vehicle 1 even when the vibration-suppression-&-correction process by the filter 114 is disabled.

Upon the performing of the process at step S26, the second switching unit SW2 in the drive-control ECU 10 is set to the filter side (as shown by a solid line in FIG. 2) (S28). As a result, the vibration-suppression-&-correction process by the filter 114 is performed with respect to the target drive force that is set according to the driver's request, thereby satisfactorily suppressing the vibration of the vehicle 1. After the process at step S28 is performed, the processes at step S20 and onwards will be performed repeatedly. If it is determined at step S20 that the VDIM flag is set to "OFF" (No at S20), the second switching unit SW2 is kept at the filter side in step S28.

Further, the present invention is not limited to these embodiments, but various variations and modifications may be made without departing from the scope of the present invention.

The present application is based on Japanese priority application No. 2005-195124 filed on Jul. 4, 2005, with the Japanese Patent Office, the entire contents of which are hereby incorporated by reference.

What is claimed is:

1. A vehicle control apparatus for controlling a vehicle in response to a target control value that relates to a travel of the vehicle, comprising:
    a first target control value setting unit configured to set a first target control value in response to a driver's request;
    a correction unit configured to correct the first target control value set by the first target control value setting unit such as to suppress over-spring vibration of the vehicle;
    a second target control value setting unit configured to set a second target control value in response to conditions different from a driver's request; and
    an arbitration unit configured to arbitrate between the first target control value and the second target control value,
    wherein if the second target control value setting unit sets the second target control value, the correction unit is prevented from correcting the first target control value, and the arbitration unit arbitrates between the first target control value not corrected by the correction unit and the second target control value.

2. The vehicle control apparatus as claimed in claim 1, further comprising a switching unit configured to selectively switch a destination of the first target control value set by the first target control value setting unit between the correction unit and the arbitration unit, wherein the switching unit supplies the first target control value directly to the arbitration unit without the correction unit serving as an intervening unit if the second target control value sets the second target control value.

3. The vehicle control apparatus as claimed in claim 1, wherein when the second target control value setting unit releases a setting of the second target control value, the correction unit receives a final output value of the arbitration unit that is output at a time the setting of the second target control value is released.

4. The vehicle control apparatus as claimed in claim 1, wherein the arbitration unit is configured to select the smaller of the first target control value or the second target control value, which are substantially simultaneously supplied.

5. The vehicle control apparatus as claimed in claim 1, wherein the arbitration unit is configured to select the larger of the first target control value or the second target control value, which are substantially simultaneously supplied.

6. The vehicle control apparatus as claimed in claim 1, wherein the second target control value setting unit is configured to set the second target control value in response to at least one of a travel condition of the vehicle and a travel environment of the vehicle such that a behavior of the vehicle is stabilized.

7. A method of suppressing vibration of a vehicle by correcting, with a correction unit, a first target control value relating to a travel of the vehicle and set according to a driver's request such as to suppress over-spring vibration of the vehicle, comprising:
    a step (a) of setting a second target control value in response to conditions different from the driver's request;
    a step (b) of preventing the correction unit from correcting the first target control value if the second target control value is set by the step (a); and
    a step (c) of arbitrating between the first target control value not corrected by the correction unit and the second target control value.

8. The method as claimed in claim 7, further comprising a step (d) of supplying a final arbitration result of the step (c) to the correction unit when a setting of the second target control value is released, the final arbitration result being a result of the step (c) that is obtained at a time the setting of the second target control value is released.

9. A vehicle control apparatus for controlling a vehicle in response to a target control value that relates to a travel of the vehicle, comprising:
    a first target control value setting unit configured to set a first target control value in response to a driver's request;
    a second target control value setting unit configured to set a second target control value in response to conditions different from a driver's request; and
    a correction unit configured to correct the first target control value set by the first target control value setting unit or the second target control value set by the second target control value setting unit such as to suppress over-spring vibration of the vehicle,
    wherein when the second target control value setting unit sets the second target control value, the first target control value is disabled, and the correction unit is prevented from correcting the second target control value under predetermined conditions.

10. The vehicle control apparatus as claimed in claim 9, further comprising a first switching unit configured to selectively enable one of the first target control value set by the first target control value setting unit and the second target control value set by the second target control value setting unit, and a second switching unit configured to control whether to supply the first target control value or second target control value output from the first switching unit to the correction unit.

11. The vehicle control apparatus as claimed in claim 9, wherein when the second target control value setting unit releases a setting of the second target control value, the correction unit receives a final output value of the second target control value setting unit that is output at a time the setting of the second target control value is released.

12. The vehicle control apparatus as claimed in claim 9, wherein the second target control value setting unit is configured to set the second target control value in response to at least one of the driver's request, a travel condition of the vehicle, and a travel environment of the vehicle such that driving of the vehicle is assisted or substituted for.

13. A method of suppressing vibration of a vehicle by correcting, with a correction unit, a first target control value relating to a travel of the vehicle and set according to a driver's request such as to suppress over-spring vibration of the vehicle, comprising:

- a step (a) of setting a second target control value in response to conditions different from the driver's request; and
- a step (b) of disabling the first target control value and preventing the correction unit from correcting the second target control value under predetermined conditions if the second target control value is set by the step (a).

14. The method as claimed in claim 13, further comprising a step (c) of supplying a final setting value of the step (a) to the correction unit when a setting of the second target control value is released, the final setting value being a value set by the step (a) at a time the setting of the second target control value is released.

* * * * *